United States Patent Office 2,917,975
Patented Dec. 22, 1959

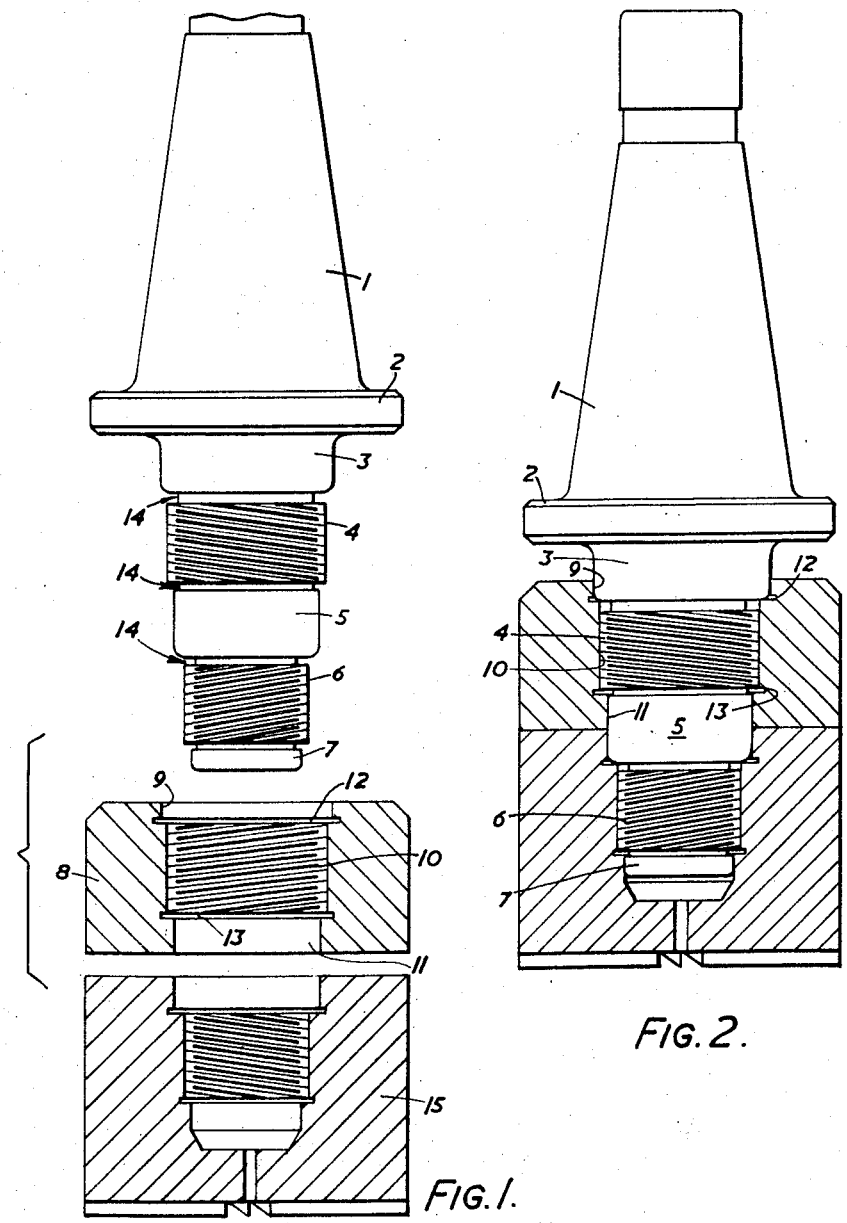

2,917,975

ARBORS FOR MILLING MACHINE CUTTERS AND LIKE ROTARY TOOLS

John Samuel Webster, Norton, Sheffield, England, assignor to The Sheffield Twist Drill & Steel Company Limited, Sheffield, England, a British company Application September 26, 1956, Serial No. 612,204

Claims priority, application Great Britain September 29, 1955

4 Claims. (Cl. 90—11)

This invention relates to arbors for milling machine cutters and like rotary tools and has for its object to provide an improved construction of arbor which provides for self-locking of the tool on the arbor and facilitates removal of the tool from the arbor after use.

The invention consists broadly of an arbor for milling machine cutters and like rotary tools comprising an outer end piece having a first or inner screw-threaded portion for receiving a locking nut, a second or outer screw-threaded portion of opposite hand for receiving a tool, the end piece preferably having also at least one plain or smooth cylindrical portion or register for centering the tool on the arbor.

In order that the invention may be more clearly understood one particular embodiment thereof will now be described, by way of example, with reference to the accompanying drawing wherein:

Figure 1 is an exploded view showing the locking nut and tool in section and the arbor in side elevation and Figure 2 is a similar view but showing the locking nut and tool fitted on the arbor.

Referring to these drawings the arbor comprises a tapered shank 1 having a radial driving flange 2 for fitting into driving engagement with the driving head of a milling machine in conventional manner. The arbor is provided with an outer end piece comprising a first plain or smooth cylindrical portion 3 (hereinafter referred to as the inner register) adjacent to the driving flange 2, a first or inner screw-threaded portion 4 adjacent to the inner register 3 and of smaller diameter than said inner register, a plain or smooth cylindrical portion 5 (hereinafter referred to as the intermediate register) adjacent the first or inner screw-threaded portion 4 and of smaller diameter than said screw-threaded portion, a second or outer screw-threaded portion 6 adjacent to the intermediate register 5 and of smaller diameter than said first screw-threaded portion and said intermediate register and a plain or smooth cylindrical portion 7 (hereinafter referred to as the outer register) adjacent to said second or outer screw-threaded portion and of smaller diameter than said second or outer screw-threaded portion. The first or inner larger screw-threaded portion 4 is adapted to receive a locking nut 8 and is provided with a two-start left-hand thread and the second or outer smaller screw-threaded portion 6 is adapted to receive the cutter tool 15 and is provided with a two start right-hand thread, the two threads being of equal pitch. The inner and intermediate registers 3 and 5 respectively are adapted to centre the locking nut 8 on the arbor and the intermediate and outer registers 5 and 7 respectively are adapted to centre the cutter tool on the arbor. Between the threaded portions 4, 6 and the registers 3, 5, 7 shallow annular recesses 14 are preferably provided.

The bore of the locking nut 8 for screwing onto the first or inner screw-threaded portion 4 of the outer end piece of the arbor is stepped to provide three portions 9, 10 and 11 of different diameters, separated by two shallow annular recesses 12 and 13. The innermost portion 9 of the bore is the largest diameter and has a plain or smooth cylindrical surface adapted to have a close sliding fit with the inner register 3 of the arbor. The outermost portion 11 of the bore is of the smallest diameter and has a plain or smooth cylindrical surface adapted to have a close sliding fit with the intermediate register 5. The intermediate portion 10 of the bore between said annular recesses is screw-threaded to correspond with the screw-threads of the first or inner screw-threaded portion 4 of the end piece of the arbor.

The cutter tool 15 is provided with a central bore formed in a similar manner to that of the locking nut, that is the bore is provided at one end with a plain or smooth cylindrical surface adapted to have a close sliding fit with the intermediate register 5 of the end piece of the arbor, and at the other end with a plain or smooth cylindrical surface of smaller diameter adapted to have a close sliding fit with the outer register 7 of the end piece of the arbor, the intermediate portion, of the bore between said annular recess being screw-threaded to correspond with the screw-threads of the second or outer smaller screw-threaded portion 6 of the end piece of the arbor.

In operation the locking nut 8 is screwed onto the first or inner larger screw-threaded portion 4 of the end piece of the arbor and the cutter tool is screwed onto the second or outer smaller screw-threaded portion 6 of the end piece of the arbor until it engages the locking nut. When the cutter tool is then put into use it is automatically locked firmly against the locking nut. By virtue of the fact that the locking nut and cutter tool are screwed onto portions of the arbors by means of two start left-hand screw threads and two-start right-hand screw threads respectively the locking nut can be screwed away from the cutter tool relatively easily thereby facilitating the removal of the cutter tool from the arbor.

It will be understood that the invention is not limited to the particular construction herein described by way of example; for example one or both of the screw-threaded portions of the end piece of the arbor may, in certain circumstances be provided with a single start thread instead of a two start thread and the tool may be provided with an inner sleeve member for screwing it onto the arbor instead of being screwed directly onto the arbor. If the arbor is to carry a cutting tool of opposite hand, the outer screw-threaded portion which receives the tool will have a left handed thread and the inner screw-threaded portion which receives the locking nut will have a right handed thread.

I claim:

1. An arbor for rotary machine cutting tools, said arbor comprising an outer end piece having a drive flange and a first inner screw-threaded portion threadedly receiving a lock nut, a second outer screw-threaded portion threadedly receiving a cutting tool, said first inner screw-threaded portion being of a hand opposite to the hand of said second outer screw-threaded portion, a straight cylindrical register concentric with and intermediate said first and said second outer screw-threaded portions, a smooth cylindrical inner register intermediate said drive flange and said inner screw-threaded portion, a smooth cylindrical outer register integral with and immediately beyond the outermost extremity of said second outer screw-threaded portion, and said inner register being longitudinally spaced from and of larger diameter than said inner screw-threaded portion, said inner register defining a positive stop for engagement with the lock nut threadedly carried by said inner screw-threaded portion and preventing jamming of the threads thereof.

2. An arbor according to claim 1 wherein the inner screw-threaded portion is provided with a two-start left hand thread and the outer screw-threaded portion with a two-start right hand thread.

3. An arbor according to claim 1, wherein the diameters of the inner register, the first screw-threaded portion, the intermediate register, the second screw-threaded portion and the outer register decrease progressively.

4. An arbor according to claim 3, wherein said locking nut is internally stepped to provide three portions of different diameters separated by two shallow annular recesses, the innermost and outermost portions of the bore having plain smooth cylindrical surfaces adapted to have a close-sliding fit with the inner and intermediate registers respectively and the intermediate cylindrical portion of the bore being provided with screw-threads corresponding to the screw-threaded portion of the inner screw-threaded portion of the end piece of the arbor.

References Cited in the file of this patent

UNITED STATES PATENTS

| | | |
|---|---|---|
| 1,354,097 | Fitzsimmons | Sept. 28, 1920 |
| 1,378,290 | Smith | May 17, 1921 |

FOREIGN PATENTS

| | | |
|---|---|---|
| 555,111 | Great Britain | Aug. 4, 1943 |
| 1,125,628 | France | July 16, 1956 |